July 26, 1966 H. L. PERAZONE 3,262,672
LARGE PORT GATE VALVE
Filed Nov. 13, 1963 2 Sheets-Sheet 1
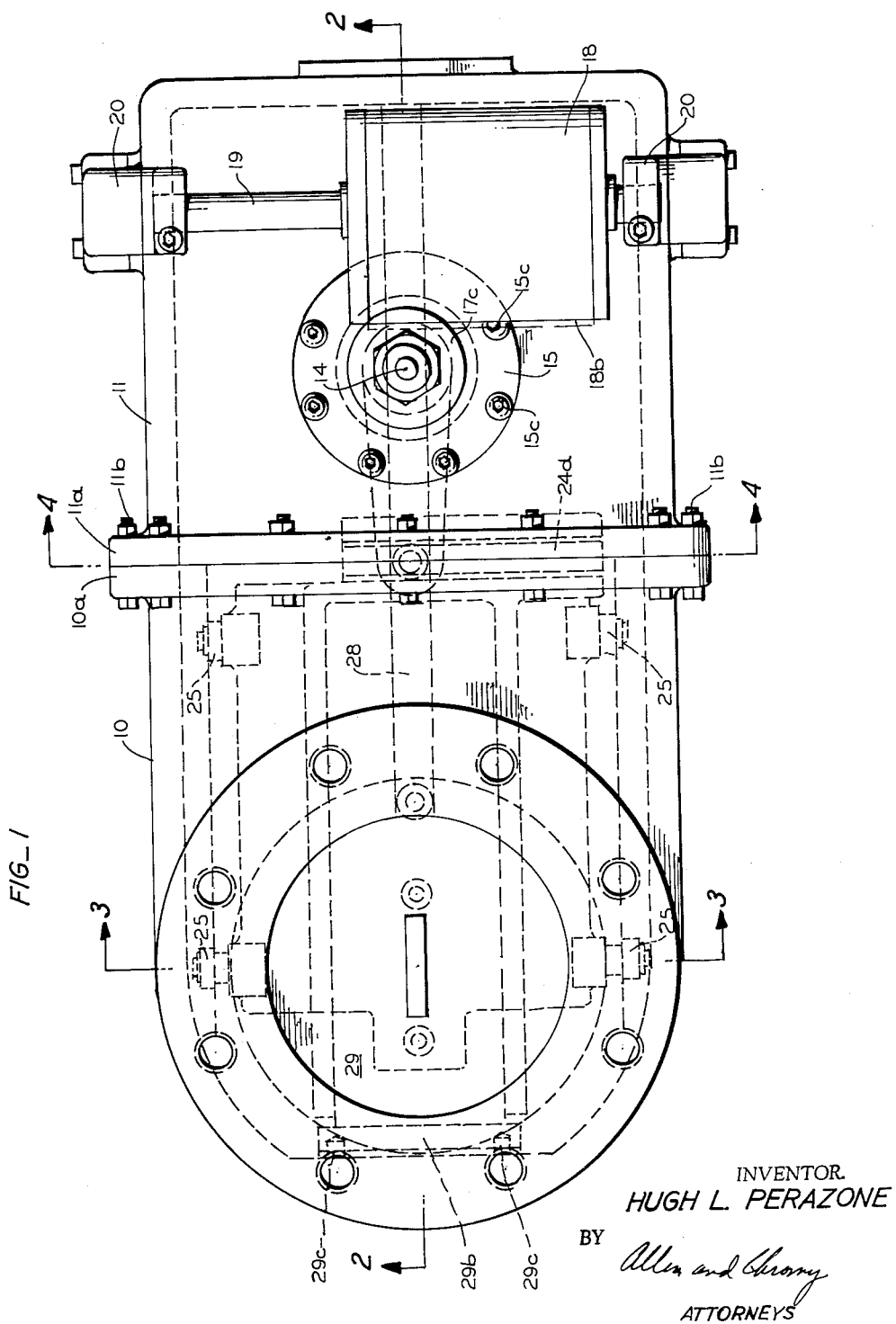
FIG_1
INVENTOR.
HUGH L. PERAZONE
BY
*Allen and Strong*
ATTORNEYS

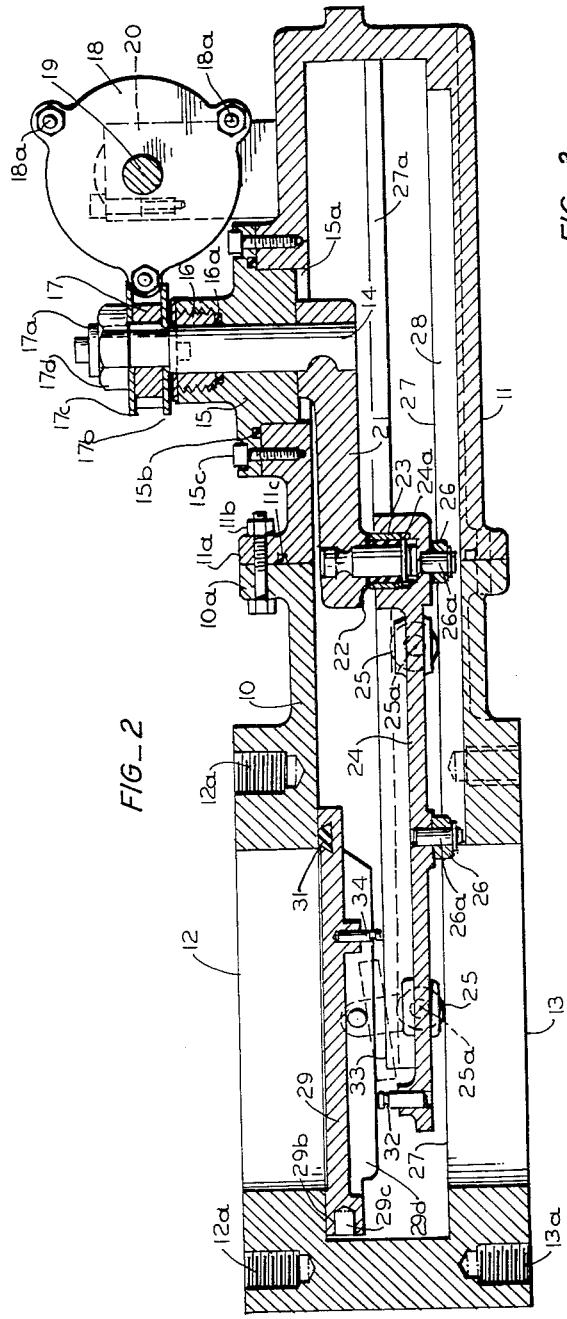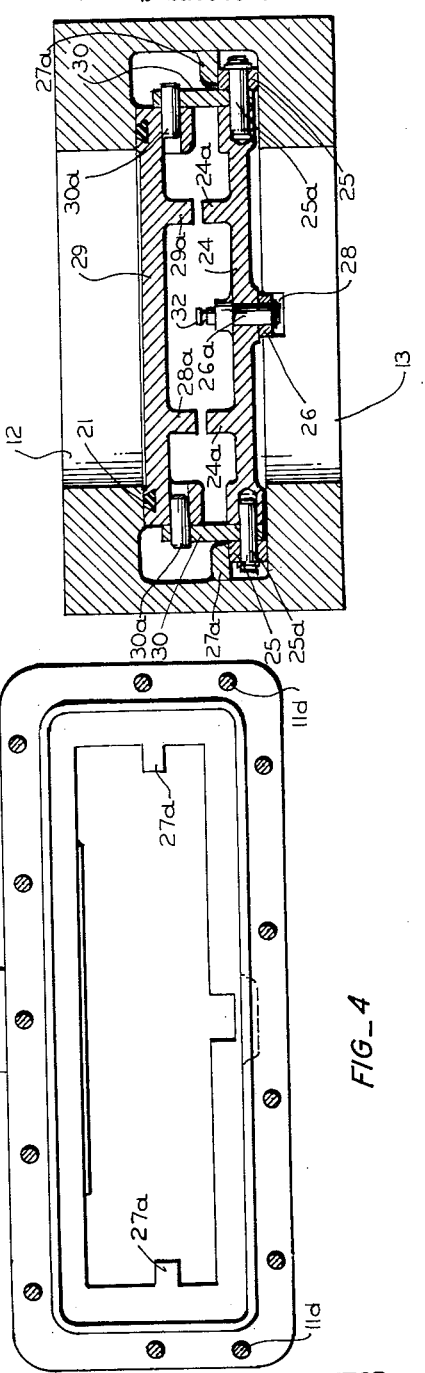
July 26, 1966     H. L. PERAZONE     3,262,672
LARGE PORT GATE VALVE
Filed Nov. 13, 1963     2 Sheets-Sheet 2
INVENTOR.
HUGH L. PERAZONE
BY
ATTORNEYS though the positioning of the state patent

United States Patent Office 3,262,672
Patented July 26, 1966

3,262,672
LARGE PORT GATE VALVE
Hugh L. Perazone, Hayward, Calif., assignor to Vacuum Research Company, San Leandro, Calif., a corporation of California
Filed Nov. 13, 1963, Ser. No. 323,422
3 Claims. (Cl. 251—204)

This invention relates to a large port gate valve having the housing thereof constructed so that the valve may be more efficiently assembled with the pipe line and serviced thereafter.

An object of this invention is to provide an improved large port gate valve having the housing thereof made in two sections, one of which may be permanently assembled with the pipe line and the other, which is provided with the valve actuating mechanism being adapted to be attached to the side of the permanently assembled section whereby the gate valve may be taken apart for servicing without removing the permanently assembled section from the pipe line.

A further object of this invention is to provide an improved gate valve of the large port type in which the valve housing is made in two sections, one of which is adapted to be permanently assembled with the pipe line and the other of which is adapted to be attached to the side of the permanently assembled section, said gate valve being provided with an operating plate which is adapted to be moved in and out of the permanently assembled section and a portion of which is adapted to project out of this permanently assembled section for connecting it to the valve operating mechanism that is assembled with the detachable section.

Other and further objects of this invention will be apparent to those skilled in the art to which it relates from the following specification, claims, and drawing.

Referring to the drawing briefly:

FIG. 1 is a top view of an embodiment of this gate valve;

FIG. 2 is a sectional view taken along the line 2—2 of FIG. 1;

FIG. 3 is a sectional view taken along the line 3—3 of FIG. 1; and

FIG. 4 is a sectional view taken along the line 4—4 of FIG. 2.

Referring to the drawing in detail, reference numeral 10 designates a portion of the valve housing that is adapted to be permanently connected into the pipe line by means of suitable bolts which are threaded into the holes 12a and 13a provided in the housing walls around the openings 12 and 13 which are lined up with the passage through the pipe line to which this valve mechanism is connected. The other section 11 of the valve housing is attached to the housing section 10 by a plurality of bolts 11b which extend through holes formed in the abutting flanges 10a and 11a formed in housing sections 10 and 11, respectively. The flange 11a is provided with a recess for receiving the gasket 11c and this gasket is pressed against the flange 10a of housing section 10 to seal the joint between flanges 10a and 11a, when the housing sections 10 and 11 are bolted together.

Member 15 forms the bearing for the crank shaft 14 and this member is positioned in the hole 15a formed in the housing section 11 to which it is attached by means of the screws or bolts 15c. A suitable recess is provided to member 15 for receiving the gasket 15b which is pressed against the housing around the hole 15a to provide a seal between member 15 and housing section 11. Another gasket 16a is positioned around the crank shaft 14 and this gasket is pressed into sealing relation between the shaft 14 and the member 15 by means of the threaded ring 16 which is threaded into the top of the member 15 and surrounds the shaft 14. A shoulder is provided to the upper part of shaft 14 and the lower washer 17b abuts this shoulder. The pinion gear 17 is positioned on the top of washer 17b, and this pinion is keyed to the upper part of the shaft 14 by the slot key 17a. Washer 17c is positioned on the top of the gear 17 and a nut 17d is threaded to the upper part of shaft 14. This nut 17d is brought against the upper surface of washer 17c and clamps this washer to the gear 17; the lower surface of gear 17 is clamped to the top of washer 17b. This washer and gear assembly cooperates with rack 18b which is attached to the movable cylinder 18. Cylinder 18 is held assembled with the end walls thereof by bolts 18a and the cylinder is slidably positioned on the rod 19. The ends of rod 19 are supported by members 20 which are attached to the sides of the housing section 11 by suitable bolts or screws. The cylinder 18, rack 18b and gear 17 are employed for actuating this valve mechanism and these parts are described in detail in my application, Serial No. 50,499, filed August 18 1960, now Patent No. 3,141,647, for Valve With Remote Control Actuator, to which reference is made for details of construction thereof.

The crank 21 is attached to the bottom part of the shaft 14 and is held thereon by a suitable key that is cast integral with the crank, whereby the crank may be rotated upon rotation of the shaft. Crank pin 22 which is provided with a suitable groove around the circumference thereof is attached to the crank 21 by casting the grooved portion thereof in the crank. The roller 23 is rotatably supported on the lower part of the crank pin 22. This roller is made up of two parts, the inner bearing part being made of plastic such as nylon or the like, and the outer part being made of hard brass. Roller 23 engages the plate member 24 in the slot 24a and, as the crank 21 is rotated in the counter-clockwise direction to open the valve, the roller 23 is moved through the slot 24a and the plate 24 is drawn into the housing section 11. The plate 24 is provided with rollers 25 which are attached thereto by means of the short shafts 25a and during the aforesaid movement of the plate 24, the forward pair of these rollers engage surfaces 27a under flanges 27 provided in housing sections 10 and 11. Additional rollers 26 are supported on the bottom surface of the plate 24 by the shafts or pins 26a, and these rollers engage the slides of the slot or recess 28 that extends longitudinally inside of the housing sections 10 and 11 from the opening 13 to the rear wall of section 11. Rollers 26 guide the plate 24 during its movement by the crank 21 and roller 23 to prevent this plate from turning during the actuation thereof.

The forward pair of rollers 25 shown in FIG. 3 are positioned to straddle the opening 13 in the valve housing 10 when the valve is closed. The pins 25a which support the forward pair of rollers 25 on the plate 24 are also used for attaching one end of each of the links 30 to the plate 24, and the upper ends of these links are pivotally attached to the valve disc 29 by the pins 30a. Thus, the valve disc 29 is pivotally attached to the plate 24. A spring 33 is provided between the plate 24 and the valve disc 29 and one end of this spring is attached to the pin 32 that is fixedly attached to plate 24, and the other end is attached to the pin 34 which is fixedly attached to the valve disc 29. This spring tends to pull the disc 29 against the plate 24. The forward end of the valve disc 29 is provided with a bumper supporting section 29b which has two holes formed therein for receiving the bumpers 29c which may be of plastic or other resilient material. These bumpers 29c engage the inner wall of the housing section 10 as shown in FIG. 2 when the opening 12 of the housing is closed by valve disc 29. Just before this opening is sealed, the bumpers 29c are brought into engagement with the inner surface of the adjacent end wall of the housing section 10.

Further rotation of the crank 21 to the position of its maximum excursion, that is, the position shown in FIG. 2, causes the plate 24 to move slightly towards the left and pressure is applied to the valve disc 29 through the links 30 whereby the gasket 31 is pressed into sealing relation with the inner surface of the valve housing section 10 around the opening 12. This action takes place because the bumpers 29c prevent further motion of the valve disc 29 to the left, and therefore, pressure is applied to this valve disc through the links 30, forcing the gasket against the housing surface while, at the same time, the forward rollers 25 are pressed against the shoulder adjacent to opening 13. The gasket 31 extends only part way around the valve disc 29 and the ends of this gasket terminate adjacent to the bumper supporting section 29b, and when the valve is closed, this section of the valve disc is brought into sealing engagement with the inner surface of the housing. When the crank 21 is turned counterclockwise to open the valve, the plate 24 is shifted to the right, thus releasing the pressure off of the forward rollers 25 and links 30, and as soon as the bumpers 29c of the valve disc 29 are moved away from the inner wall of the housing, the spring 33 moves the valve disc 29 down until the ribs 29a thereof engage the ribs 24a of the plate 24. When these ribs are in contact, further motion of the plate 24 to the right also moves the valve disc 29 to the right and the bumper members 29c away from the wall of the valve housing.

In placing this gate valve into service, the housing section 10 is first connected to the pipe line by lining up the openings 12 and 13 thereof, with the passage through the pipe line, and connecting the flanges (not shown) of the pipe line to the housing section 10 by inserting suitable bolts (not shown) through the holes in the pipe line flanges into the threaded holes 12a and 13a of the housing section. The valve assembly, including the plate 24 and valve disc 29, may then be inserted into the housing section 10, leaving the slotted portion 24a projecting slightly therefrom in position to receive the roller 23 of the actuating mechanism. The housing section 11, with the assembled actuating mechanism, may then be assembled with the housing section 10 by placing roller 23 into slot 24a of plate 24 and bringing the flange portion 11a thereof up against the flange portion 10a of section 10. Dowels 11d are provided to flange 11a and suitable holes aligned with these dowels are provided to flange 10a to facilitate aligning the housing section 11 with the housing section 10 prior to bolting these sections together with bolts 11b.

While I have shown and described a preferred embodiment of the invention, it is apparent that the invention is capable of variation and modification from the form shown so that the scope thereof should be limited only by the proper scope and interpretation of the claims appended hereto.

What I claim is:

1. A gate valve adapted for sealing high vacuum lines, comprising a valve housing made in two parts, one of said parts having a pair of openings communicating with a passage therethrough that is adapted to be sealed, said one part also having means for connecting it to a high vacuum line, each of said parts having means for connecting said parts together and holding said parts assembled, said housing having a chamber therein extending through both of said parts, said chamber in said one part having a width greater than the diameter of said passage so that a shoulder is provided in said chamber on one side thereof around one of said openings and a sealing surface is provided in said chamber on the opposite side thereof around the other of said openings, a movable plate positioned in said chamber, said plate having a width greater than the diameter of said openings, roller means rotatably attached to the forward part of said plate engaging said shoulder, a valve disc having sealing means engaging said sealing surface when the valve is closed, a pair of links, means for pivotally connecting one end of one of said links to one side of said valve disc and pivotally connecting one end of the other of said links to a substantially diametrically opposed part of said valve disc, means separately pivotally connecting the other ends of said links to said movable plate adjacent to said roller means, resilient means connected between said movable plate and said valve disc for pulling said valve disc against said plate, bumper means on the forward end of said valve disc for engaging an inner wall of said chamber when said valve disc is carried by said movable plate into valve closing position, means for moving said movable plate and said valve disc forward until said bumper means engage said inner wall at which time further forward movement of said movable plate causes said valve disc to be swung on said links into sealing engagement with said sealing surface, said housing having a recess in an inner surface extending from said shoulder substantially to the rear end wall through the mid-portion thereof, additional rollers pivotally attached to the mid-portion of said movable plate positioned in said recess for guiding said movable plate, and means for supporting said moving means on said other housing part so that said moving means may be detached from said plate when said other housing part is removed from said one housing part without removing said one housing part from the high vacuum line.

2. A gate valve adapted for sealing high vacuum lines, comprising a valve housing made in two parts, one of said parts having a pair of openings communicating with a passage therethrough that is adapted to be sealed, said one part also having means for connecting it to a high vacuum line, each of said parts having means for connecting said parts together and holding said parts assembled, said housing having a chamber therein extending through both of said parts, said chamber in said one part having a width greater than the diameter of said passage so that a shoulder is provided in said chamber on one side thereof around one of said openings and a sealing surface is provided in said chamber on the opposite side thereof around the other of said openings, a movable plate positioned in said chamber, said plate having a width greater than the diameter of said openings, roller means rotatably attached to the forward part of said plate engaging said shoulder when the valve is closed, a pair of links, means for pivotally connecting one end of one of said links to one side of said valve disc and pivotally connecting one end of the other of said links to a substantially diametrically opposed part of said valve disc, means separately pivotally connecting the other ends of said links to said movable plate adjacent to said roller means, bumper means on the forward end of said valve disc for engaging an inner wall of said chamber when said valve disc is carried by said movable plate into valve closing position, said movable plate having a transversely extending slot, an arm having a roller movable in said slot for moving said movable plate and said valve disc forward until said bumper means engage said inner wall at which time further forward movement of said movable plate causes said valve disc to be swung on said links into sealing engagement with said sealing surface, said housing having a recess in an inner surface extending from said shoulder substantially to the rear end wall, additional rollers pivotally attached to the mid-portion of said movable plate for guiding said movable plate, means for supporting said arm on said other housing part so that said roller of said arm may be detached from said plate when said other housing part is removed from said one housing part without removing said one housing part from the high vacuum line.

3. A gate valve adapted for sealing high vacuum lines, comprising a valve housing made in two parts, one of said parts having a pair of openings communicating with a passage therethrough that is adapted to be sealed, said one part also having means for connecting it to a high vacuum line, each of said parts having means for connecting said parts together and holding said parts assembled, said housing having a chamber therein extending through both of said parts, said chamber in said one part having a width greater than the diameter of said passage so that a shoulder is provided in said chamber on one side thereof around one of said openings and a sealing surface is provided in said chamber on the opposite side thereof around the other of said openings, a movable plate positioned in said chamber, said plate having a width greater than the diameter of said openings, roller means rotatably attached to the forward part of said plate rotatably engaging said shoulder, a valve disc having sealing means engaging said sealing surface when the valve is closed, a pair of links, means for pivotally connecting one end of one of said links to one side of said valve disc and connecting one end of the other of said links to the other side of said valve disc, means separately pivotally connecting the other ends of said links to said movable plate adjacent to said roller means so that when said valve disc is pressed against said sealing surface said links press said rollers against said shoulder, bumper means on the forward end of said valve disc for engaging an inner wall of said chamber when said valve disc is carried by said movable plate into valve closing position, said movable plate having a transversely extending slot, an arm having a roller movable in said slot for moving said movable plate and said valve disc forward until said bumper means engage said inner wall at which time further forward movement of said movable plate causes said valve disc to be swung on said links into sealing engagement with said sealing surface, said one part of said housing having a length such that said slot of said plate is exposed sufficiently to receive the roller of said arm when said plate and said valve disc are positioned therein, said housing having a recess in an inner surface extending from said shoulder substantially to the rear end wall, additional rollers pivotally attached to the mid-portion of said movable plate for guiding said movable plate, means for supporting said arm on said other housing part so that said roller of said arm may be detached from said plate when said other housing part is removed from said one housing part without removing said one housing part from the high vacuum line.

References Cited by the Examiner
UNITED STATES PATENTS

| | | | |
|---|---|---|---|
| 2,676,780 | 4/1954 | Wheatley | 251—204 |
| 2,820,479 | 1/1958 | Jenkins | 251—326 X |
| 2,850,260 | 9/1958 | Perazone et al. | 251—203 X |
| 3,072,378 | 1/1963 | Holderer | 251—204 X |

M. CARY NELSON, *Primary Examiner.*

A. ROSENTHAL, *Examiner.*